(12) United States Patent
Marinier et al.

(10) Patent No.: US 8,687,508 B2
(45) Date of Patent: Apr. 1, 2014

(54) METHOD AND APPARATUS FOR DYNAMICALLY ALLOCATING HARQ PROCESSES IN THE UPLINK

(75) Inventors: Paul Marinier, Brossard (CA); Eldad M. Zeira, Huntington, NY (US); Alexander Reznik, Titusville, NJ (US); Sudheer A. Grandhi, Mamaroneck, NY (US); Stephen E. Terry, Northport, NY (US); Christopher Cave, Verdun (CA)

(73) Assignee: InterDigital Technology Corporation, Wilmington, DE (US)

( * ) Notice: Subject to any disclaimer, the term of this patent is extended or adjusted under 35 U.S.C. 154(b) by 1480 days.

(21) Appl. No.: 11/841,156

(22) Filed: Aug. 20, 2007

(65) Prior Publication Data

US 2008/0059859 A1    Mar. 6, 2008

Related U.S. Application Data

(66) Substitute for application No. 60/839,172, filed on Aug. 21, 2006.

(60) Provisional application No. 60/829,457, filed on Oct. 13, 2006, provisional application No. 60/863,543, filed on Oct. 30, 2006, provisional application No. 60/868,185, filed on Dec. 1, 2006.

(51) Int. Cl.
 *H04L 1/00*     (2006.01)
(52) U.S. Cl.
 USPC .......................................... 370/252
(58) Field of Classification Search
 USPC ......... 370/229, 230, 231, 235, 252, 242, 278, 370/310, 328, 331, 343, 338, 352, 468, 389, 370/226, 394, 395.4; 455/69, 67.11, 522; 714/749, 748, 18
See application file for complete search history.

(56) References Cited

U.S. PATENT DOCUMENTS

| | | | |
|---|---|---|---|
| 7,594,153 B2 | 9/2009 | Kim et al. | |
| 2004/0009786 A1* | 1/2004 | Terry | 455/522 |
| 2005/0281232 A1* | 12/2005 | Kim et al. | 370/335 |
| 2006/0104242 A1* | 5/2006 | Kim et al. | 370/329 |
| 2006/0176856 A1* | 8/2006 | Yang et al. | 370/331 |

(Continued)

FOREIGN PATENT DOCUMENTS

| | | |
|---|---|---|
| GB | 2 378 101 | 1/2003 |
| WO | 2006/100597 | 9/2006 |
| WO | 2007/027513 | 3/2007 |
| WO | 2007/052118 | 5/2007 |

OTHER PUBLICATIONS

3GPP Technical Specification, 3GPP TS 25.309 V6.6.0, Mar. 2006, ARIB STD T63-25.309, version 6.6.0, pp. 1-34.*

(Continued)

*Primary Examiner* — Abdullah Riyami
(74) *Attorney, Agent, or Firm* — Volpe and Koenig, P.C.

(57) ABSTRACT

In a wireless communication system including at least one wireless transmit/receive unit (WTRU) and at least one Node-B (NB), an activation or deactivation state is determined for each of a plurality of HARQ processes. A signal that includes the activation or deactivation state for each of the HARQ processes is transmitted to the WTRU. In response to receiving the signal, the WTRU activates or deactivates a particular HARQ process in accordance with the activation or deactivation state for each of the HARQ processes contained in the received signal.

21 Claims, 8 Drawing Sheets

(56) References Cited

U.S. PATENT DOCUMENTS

| | | | |
|---|---|---|---|
| 2006/0215560 A1* | 9/2006 | Sebire et al. | 370/235 |
| 2006/0281417 A1* | 12/2006 | Umesh et al. | 455/69 |
| 2007/0036108 A1* | 2/2007 | Benoist | 370/331 |
| 2007/0047451 A1* | 3/2007 | Lohr et al. | 370/242 |
| 2007/0047452 A1* | 3/2007 | Lohr et al. | 370/242 |
| 2007/0061673 A1* | 3/2007 | Pan et al. | 714/758 |
| 2007/0223405 A1* | 9/2007 | Jiang et al. | 370/278 |
| 2007/0223469 A1* | 9/2007 | Chandra et al. | 370/389 |
| 2007/0230398 A1* | 10/2007 | Jiang | 370/329 |
| 2007/0248099 A1* | 10/2007 | Liljestrom et al. | 370/395.4 |
| 2008/0080465 A1* | 4/2008 | Pajukoski et al. | 370/342 |
| 2008/0095109 A1* | 4/2008 | Malladi et al. | 370/330 |
| 2008/0130492 A1* | 6/2008 | Kuo | 370/226 |
| 2008/0267157 A1* | 10/2008 | Lee et al. | 370/342 |
| 2009/0141675 A1* | 6/2009 | Sebire et al. | 370/329 |
| 2010/0150078 A1* | 6/2010 | Pan et al. | 370/328 |

OTHER PUBLICATIONS

3GPP, "3$^{rd}$ Generation Partnership Project; Technical Specification Group Radio Access Network; Medium Access Control (MAC) protocol specification (Release 6)," 3GPP TS 25.321 V6.9.0 (Jun. 2006).

3GPP, "3$^{rd}$ Generation Partnership Project; Technical Specification Group Radio Access Network; Medium Access Control (MAC) protocol specification (Release 6)," 3GPP TS 25.321 V6.13.0 (Jun. 2007).

3GPP, "3$^{rd}$ Generation Partnership Project; Technical Specification Group Radio Access Network; FDD Enhanced Uplink; Overall description; Stage 2 (Release 6)," 3GPP TS 25.309 V6.6.0 (Mar. 2006).

3GPP, "3$^{rd}$ Generation Partnership Project; Technical Specification Group Radio Access Network; Physical channels and mapping of transport channels onto physical channels (FDD) (Release 6)," 3GPP TS 25.211 V6.7.0 (Dec. 2005).

3GPP, "3$^{rd}$ Generation Partnership Project; Technical Specification Group Radio Access Network; Multiplexing and channel coding (FDD) (Release 6)," 3GPP TS 25.212 V6.8.0 (Jun. 2006).

3GPP, "3$^{rd}$ Generation Partnership Project; Technical Specification Group Radio Access Network; Multiplexing and channel coding (FDD) (Release 6)," 3GPP TS 25.212 V6.10.0 (Dec. 2006).

Motorola, "Scope of Future FDD HSPA Evolution," R2-061462, (May 8-12, 2006).

Nokia, "VoIP Reference Configurations," 3GPP R2-060569, (Feb. 13-17, 2006).

Interdigital, "VoIP Performance Enhancements beyond CPC," 3GPP R1-062158, (Aug. 28-Sep. 1, 2006).

Interdigital, "Further Results on VoIP Enhancements for HSPA Evolution," 3GPP R1-062666 (Oct. 9-13, 2006).

3GPP, "3$^{rd}$ Generation Partnership Project; Technical Specification Group Radio Access Network; Continuous Connectivity for Packet Data Users; (Release 7)," 3GPP TR 25.903 V1.0.0 (May 2006).

3GPP, "3$^{rd}$ Generation Partnership Project; Technical Specification Group Radio Access Network; Continuous Connectivity for Packet Data Users; (Release 7)," 3GPP TR 25.903 V7.0.0 (Mar. 2007).

Panasonic, "HARQ Process Restriction/Reservation for Non-Scheduled Transmissions," 3GPP TSG-RAN WG2 Meeting #49, R2-052852 (Nov. 7-11, 2005).

Nortel Networks, "Alignment to stage 3 and removal of details," 3GPP TSG-RAN-WG2 Meeting #49, R2-053093 (Nov. 7-11, 2005).

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.1.0 (Jun. 2007).

3GPP, "3rd Generation Partnership Project; Technical Specification Group Radio Access Network; Physical layer procedures (Release 8)," 3GPP TS 36.213 V1.2.0 (May 2007).

Nokia, "Signalling for Simple Per Process Scheduling," 3GPP TSG-RAN WG2 Meeting #46bis, R2-051145 (Apr. 4-8, 2005).

Panasonic, "HARQ Process Restriction/Reservation for Non-Scheduled Transmissions," 3GPP TSG-RAN WG2 Meeting #48bis, R2-052433 (Oct. 10-14, 2005).

Panasonic, "HARQ process restricition/reservation for non-scheduled transmissions," 3GPP TSG-RAN WG2 Meeting #48bis, R2-052385 (Oct. 10-14, 2005).

* cited by examiner

METHOD AND APPARATUS FOR DYNAMICALLY ALLOCATING HARQ PROCESSES IN THE UPLINK

CROSS REFERENCE TO RELATED APPLICATIONS

This application claims the benefit of U.S. Provisional Application No. 60/839,172, filed Aug. 21, 2006, U.S. Provisional Application No. 60/829,457, filed Oct. 13, 2006, U.S. Provisional Application No. 60/863,543, filed Oct. 30, 2006, and U.S. Provisional Application No. 60/868,185, filed Dec. 1, 2006, all of which are incorporated herein by reference as if fully set forth.

FIELD OF INVENTION

The present invention is related to a wireless communication systems. More particularly, a method and apparatus for dynamically allocating hybrid automatic repeat request (HARQ) processes for wireless transmit/receive units (WTRUs) in the uplink is disclosed.

BACKGROUND

The uplink capacity in a code division multiple access (CDMA)-based system, such as high speed packet access (HSPA), or a single channel frequency division multiple access (SC-FDMA) system, such as an evolved universal terrestrial radio access network (E-UTRAN), is limited by interference. For a CDMA-based system, uplink interference at a specific cell site is typically generated by WTRUs, (i.e., users) connected to the cell as well as WTRUs connected to other cells. In the case of an SC-FDMA-based system, uplink interference stems primarily from WTRUs connected to other cells. To maintain coverage and system stability, a cell site can tolerate only up to a certain amount of uplink interference at any given instant in time. As a result, system capacity is maximized if interference can be kept constant as a function of time. This consistency allows a maximum of users to transmit and/or generate interference without having the uplink interference exceeding a predetermined threshold at any time.

High-speed uplink packet access (HSUPA), as defined in the Third Generation Partnership Project (3GPP) Release 6, employs HARQ with synchronous retransmissions. When utilizing a 2 millisecond (ms) transmission timing interval (TTI), the minimum instantaneous data rate is often larger than the data rate offered by an application, due to the need to transmit a number of bits that is at least the size of a single radio link control (RLC) protocol data unit (PDU) in a given TTI. When this occurs, a WTRU can utilize only a subset of the available HARQ processes. As a result, the interference generated by a given active WTRU is not constant over a time span of eight (8) TTIs. During some TTIs, the WTRU transmits data and the interference it generates is high. During other TTIs, the WTRU may only transmit control information and, therefore, the interference it generates is low. In order to equalize interference across all TTIs, the system can restrict each WTRU to use a certain WTRU-specific subset of HARQ processes, and select different subsets for different WTRUs.

Transmissions from a WTRU for a certain stream of data may be managed by non-scheduled transmissions or scheduling grants. With non-scheduled transmissions, the WTRU can freely transmit up to a fixed data rate in certain HARQ processes. With scheduling grants, the WTRU can also transmit up to a certain data rate on certain HARQ processes, but the maximum data rate is subject to change dynamically depending on the maximum power ratio signaled by a Node-B at a given time.

When the network manages the transmission by allowing non-scheduled transmissions, the set of HARQ processes is signaled to the WTRU through radio resource control (RRC) signaling. The Node-B determines the set of HARQ processes and signals this information to the radio network controller (RNC), which then relays it to the user through RRC signaling. An advantage of managing delay-sensitive traffic with non-scheduled transmissions is that it eliminates the possibility of any additional delay that could be caused by insufficiency of the resources granted by the Node-B when managing the transmissions with scheduling grants. Another advantage is that it eliminates the signaling overhead due to the transmission of scheduling information that is required with scheduling grants.

With the currently defined mechanisms for non-scheduled transmissions, however, the performance of the system is sub-optimal when the application mix is dominated by delay-sensitive applications that generate traffic patterns exhibiting periods of high activity alternated with periods of low activity. An example of this type of application is the voice over Internet protocol (VoIP) application, in which silence periods translate into a very low amount of traffic needing to be transmitted. When the cell or system is dominated by this type of application, capacity is maximized only if the network is capable of modifying the subset of HARQ processes used by a WTRU when its activity state changes, so that the interference is always equalized across the HARQ processes. Otherwise, the network has to restrict the number of WTRUs utilizing a certain HARQ process so that the threshold is not exceeded, even when they are all active at the same time, resulting in a much lower capacity.

An issue when utilizing non-scheduled transmissions is that it allows modification of the subset of allowed HARQ processes only through RRC signaling, which typically involves latencies of several hundreds of milliseconds. This latency is significant compared to a typical interval between changes of activity for applications such as voice applications. Furthermore, RRC signaling in the current Release 6 architecture is controlled by the RNC. Therefore, the Node-B needs to signal the modification of the subset of allowed HARQ processes to the RNC beforehand. The interval of time between the change of activity state at the WTRU and the effective change of HARQ processes may well be larger than the duration of the activity state. Accordingly, this becomes unworkable for equalizing interference across HARQ processes.

It would therefore be beneficial to provide a method and apparatus for dynamically allocating HARQ processes in the uplink that would aid in optimizing capacity with non-scheduled transmissions.

SUMMARY

A method and apparatus for dynamically allocating HARQ processes is disclosed. In a wireless communication system including at least one WTRU and at least one Node-B (NB), an activation or deactivation state is determined for each of a plurality of HARQ processes. A signal that includes the activation or deactivation state for each of the HARQ processes is transmitted to the WTRU. In response to receiving the signal, the WTRU activates or deactivates a particular HARQ process in accordance with the activation or deactivation state for each of the HARQ processes contained in the received signal.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
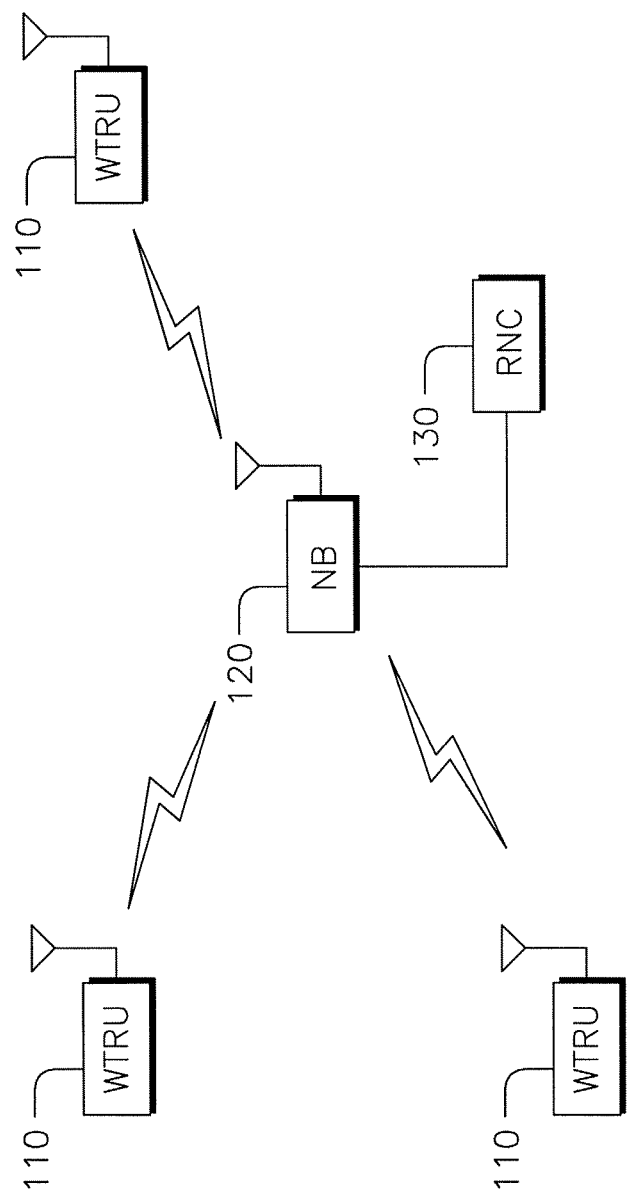
FIG. 1 shows an exemplary wireless communication system including a plurality of WTRUs, and a Node-B.

FIG. 1 shows an exemplary wireless communication system 100 including a plurality of WTRUs 110, a Node-B (NB) 120, and a radio network controller (RNC) 130. As shown in FIG. 1, the WTRUs 110 are in wireless communication with the NB 120, which is connected to the RNC 130. Although three WTRUs 110, one NB 120, and one RNC 130 are shown in FIG. 1, it should be noted that any combination of wireless and wired devices may be included in the wireless communication system 100.

Figure 2:
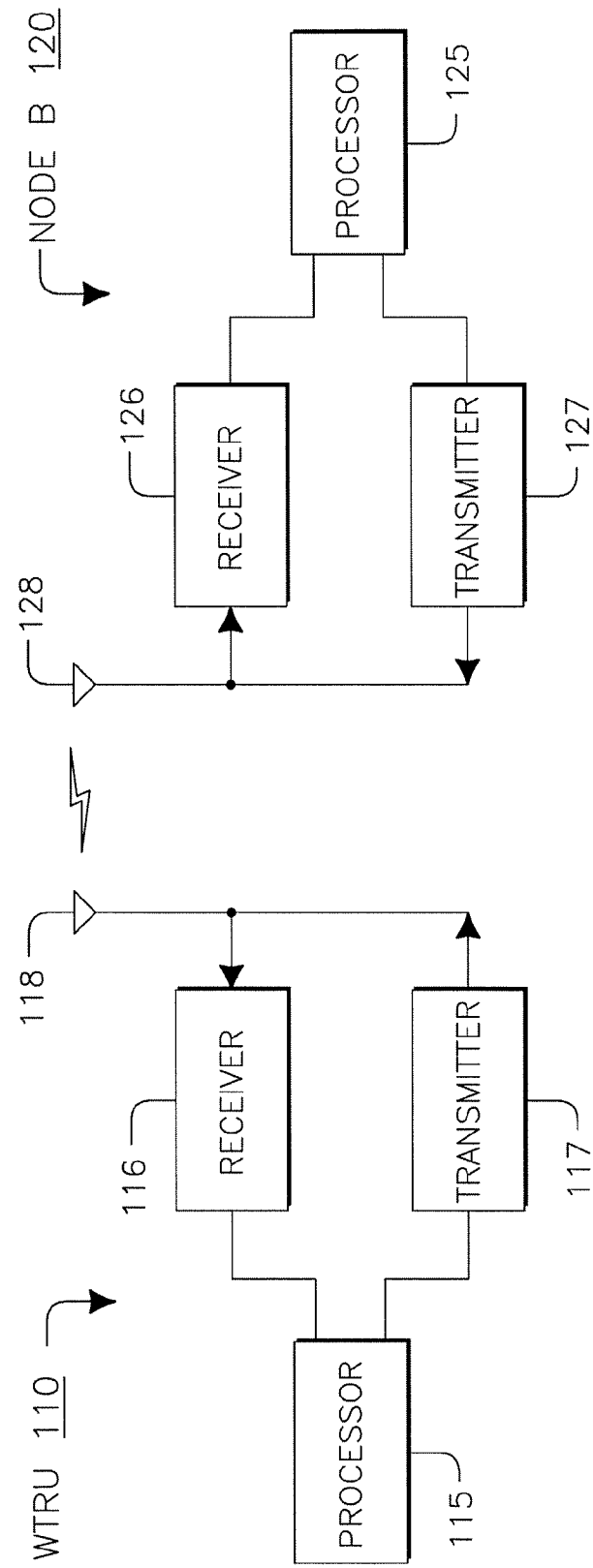
FIG. 2 is a functional block diagram of a WTRU and the Node-B of FIG. 1.

FIG. 2 is a functional block diagram 200 of a WTRU 110 and the NB 120 of the wireless communication system 100 of FIG. 1. As shown in FIG. 2, the WTRU 110 is in communication with the NB 120 and both are configured to perform a method of dynamic process allocation.

In addition to the components that may be found in a typical WTRU, the WTRU 110 includes a processor 115, a receiver 116, a transmitter 117, and an antenna 118. The processor 115 is configured to perform a dynamic process allocation procedure. The receiver 116 and the transmitter 117 are in communication with the processor 115. The antenna 118 is in communication with both the receiver 116 and the transmitter 117 to facilitate the transmission and reception of wireless data.

In addition to the components that may be found in a typical NB, the NB 120 includes a processor 125, a receiver 126, a transmitter 127, and an antenna 128. The processor 115 is configured to perform a dynamic process allocation procedure. The receiver 126 and the transmitter 127 are in communication with the processor 125. The antenna 128 is in communication with both the receiver 126 and the transmitter 127 to facilitate the transmission and reception of wireless data.

Figure 3A:
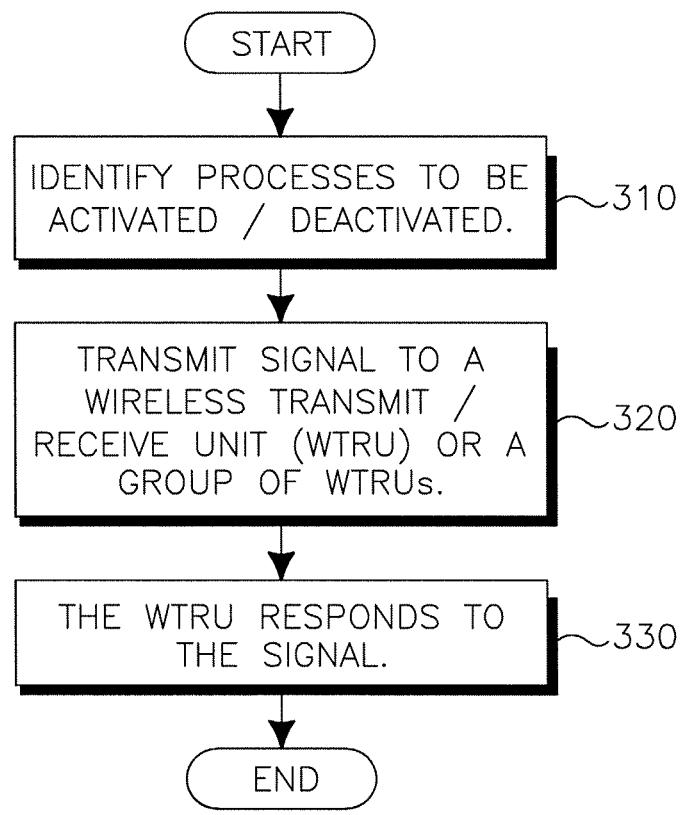
FIG. 3A is a flow diagram of a method of allocating processes.

FIG. 3A is a flow diagram of a method 300 of allocating processes. In general, the method 300 involves signaling to the WTRU 110 a subset of allowed HARQ processes. This signaling is preferably used for those WTRUs 110 utilizing non-scheduled transmissions with 2 ms TTIs, and those enabled to utilize the method 300. Also, preferably, the information required for enablement is communicated to the network through RRC signaling that is defined over one or more TTIs.

In step 310, HARQ processes to be activated or deactivated are identified and signaled to a WTRU 110 or group of WTRUs 110 (step 320). This signaling may be performed in a variety of ways.

For example, in one preferred method, each time a signal command is sent, an individual HARQ process is either activated or deactivated, depending on its current activation state. In this way, the number of bits that require encoding depends on the maximum number of HARQ processes. For eight (8) HARQ processes, as are used in HSUPA, 3 bits would need to be signaled, plus an additional bit that indicates whether the HARQ process is to be activated/deactivated. It could also be implicit that the command signal toggles between activation and deactivation, where the last bit would be omitted since it would be unneeded. However, in this manner, the WTRU 110 would have to know beforehand how to interpret the signal.

Another alternative method could be that each time the command signal is sent, one HARQ process is activated and another HARQ process is deactivated. In this method, enough bits to encode two HARQ processes, (e.g., six (6) bits), would be required. In this manner, a HARQ process that is deactivated may be activated and a HARQ process that is activated may be deactivated. Alternatively, all active HARQ processes may be deactivated, and all deactivated HARQ processes may be activated.

Steps 310 and 320 of method 300 may also be performed by implicitly signaling the activation or de-activation of an individual HARQ process by the transmission time of the signaling, such as the frame and sub-frame. For example, a rule may be pre-established between the frame/sub-frame number of the signaling command and the HARQ process involved. In this way, no bit is necessarily required to specify an individual HARQ process, but the NB 120 would be constrained to activate/de-active the individual HARQ process only at a specific frame or sub-frame. However, a single bit may be utilized if desirable to signal whether a process is activated or deactivated. Alternatively, a combination of methods may be used, such as by indicating de-activation of an individual process by the transmission time and indicating the activation of a process by using a bit or bits, or vice versa.

Yet another alternative for employing steps 310 and 320 of the method 300 of FIG. 3A is to utilize the signaling command to specify the activation or deactivation of all HARQ processes at once. This may be accomplished by defining a bit map where each bit represents a HARQ process and the value of the bit indicates whether or not the process should be activated or deactivated, or the active/deactive state of the process merely switched.

It should be noted that in the current state of the art, HARQ process numerators, also referred to as HARQ process indices, are WTRU specific. However, the RNC 130 may align the numerators so that broadcast information may be used by all WTRUs 110 in communication with the RNC 130. Alternatively, a particular WTRU 110 may be signaled before the correspondence between each bit of the bitmap and each HARQ process numerator.

For example, there are eight (8) possible HARQ processes for each WTRU that are identified with an index, (e.g., from 1 to 8). As the WTRUs 110 are not synchronized with one another, HARQ process N for a particular WTRU 110 is generally not transmitted at the same time as HARQ process N for another WTRU 110. However, the NB 120 may desire to activate or deactivate HARQ processes for multiple WTRUs 110 that are transmitted at a specific time. To enable this signaling to take place in a "broadcast" scenario, the HARQ process indices of the different WTRUs 110 should be synchronized so that HARQ process N for one particular WTRU 110 is transmitted at the same time as HARQ process N for any other WTRU 110. Alternatively, each WTRU 110 may be made aware in advance which process index should be turned on or off if the NB 120 signals that all processes being transmitted at a given time, that may be specified by some common reference, should be turned on or off.

In another way of performing steps 310 and 320 of the method 300 of FIG. 3A, the WTRU 110 may be permitted to utilize an individual process that has been "toggled off" under conditions pre-specified or signaled from the network beforehand. One of these conditions may include the buffer occupancy of data for uplink transmission by the WTRU 110. The number of bits associated with each individual process could vary and may indicate a priority of usage in that different priorities would correspond to respective different sets of conditions for usage of each individual process.

The number of bits may be equal to the maximum number of HARQ processes. For example, eight (8) bits are used for HSUPA. Alternatively, the required number of bits could be reduced if the set of HARQ processes that can potentially be activated for a particular WTRU 110 is smaller than the maximum number of possible HARQ processes. The set of potentially activated HARQ processes could be signaled to the WTRU 110 through higher-layers, (e.g., RRC) in the same way that a set of restricted HARQ processes is signaled.

The signaling command may also specify the set of allowed HARQ processes, (i.e., those HARQ processes that the WTRU 110 can use for uplink transmission), taking effect immediately or at a fixed delay from when the information is received by the WTRU 110. Alternatively, the updated set of allowed processes can take effect at a time specified in the signaling message itself. Preferably, the set of allowed HARQ processes is signaled as an index into a table where multiple sets of allowed HARQ processes are already pre-defined and known at the WTRU 110. The number of bits representing the index will limit the number of sets that can be pre-defined. The mapping between the index and set of allowed HARQ processes can be pre-configured through higher layer signaling or the set of allowed HARQ processes can be explicitly signaled to the WTRU 110 by enumerating the specific allowed process numbers.

Another way to perform steps 310 and 320 of the method 300 of FIG. 3A is for the signaling to specify the probabilities for which the WTRU 110 should turn on or off individual HARQ processes. Preferably, a single probability value is signaled per HARQ process, (e.g., turn off), and a second probability value, (e.g., turn on), is calculated by using the signaled value according to a predefined rule. Alternatively, both the off and on probabilities may be explicitly signaled to the WTRU 110.

For any of the above described methods, the signaling commands may be sent (step 320), or directed, to an individual WTRU 110 or to a plurality of WTRUs 110.

In one preferred embodiment, the functionality of the enhanced dedicated channel (E-DCH) absolute grant channel (E-AGCH) may be extended by defining additional interpretation of the information bits. The correct interpretation may be known to the WTRU 110 by time multiplexing in different TTIs and/or by using different spreading codes. The times and codes may be signaled to the WTRU 110 by the network. Additionally, the interpretation may be implied by an identification code embedded in the E-AGCH such as the WTRU ID. This is equivalent to defining a new physical channel with a new name, (e.g., enhanced active process indicator channel (E-APICH), that may be time and/or code-multiplexed with the E-AGCH.

Currently, the E-AGCH identifies WTRUs 110 by masking the cyclic redundancy code (CRC) with enhanced radio network temporary identifiers (E-RNTIs) of 16 bits. This approach could be extended by defining additional E-RNTIs for non-scheduled transmissions for the WTRUs 110 that use both scheduled and non-scheduled transmissions. The WTRU 110 should respond to more than one E-RNTI. It is also possible to separate scheduled and non-scheduled operations in time. For processes that have been allowed use by the RNC 130 for non-scheduled operation, the AGCH utilizes the bit interpretation as described in the embodiments above, while in other processes it utilizes the bit interpretation as utilized in the current state of the art.

Additionally, the network may define groups of WTRUs 110 and E-RNTI values for these groups. This allows faster signaling in case some HARQ processes need to be deactivated for multiple WTRUs 110. Accordingly, a particular WTRU 110 can be associated with a set of E-RNTI values, among which some may be common to multiple WTRUs 110. Further processing may be similar to what is currently defined for the E-AGCH, such as convolutional encoding followed by rate matching. There are additional possibilities in terms of coding rate, amount of rate matching, size of CRC, and the like, to fit the required number of information bits on the E-AGCH or E-APICH. Preferably, the coding rate and rate matching should be kept the same as the prior art E-AGCH to simplify decoding operation at the WTRU 110. By way of example, the E-AGCH may contain the WTRU ID information (E-RNTI)/CRC (16 bits) and 6 bits of payload. Depending on how many bits are needed to encode the instructions, one or more E-AGCH transmissions may be combined by concatenating their available bits. In another example, the E-RNTI/CRC field may be reduced from 16 bits to a smaller number of bits to increase the available number of bits.

Another way of signaling the WTRU 110 in step 320 may be to extend the E-RGCH/E-HICH functionality, or multiplex a newly defined channel with these channels by utilizing distinct orthogonal sequences to contain the new signaling. This option allows the transmission of a binary value every TTI. One or more WTRUs 110 is identified by an orthogonal sequence (signature). It is also possible to transmit three (3) binary values by not combining the sequences in each of the three (3) slots of the TTI. However, this way may require greater transmission power. If the number of orthogonal sequences required to support the new signaling and the existing enhanced relative grant channel (E-RGCH)/enhanced HARQ indicator channel (E-HICH) is insufficient, a different spreading code may be utilized to contain the new signaling, allowing the reuse of the orthogonal sequences of the E-RGCH/E-HICH.

Alternatively, the format of the high speed shared control channel (HS-SCCH) may be modified to include activation/ de-activation commands. The format for the additional bits may be similar to the methods set forth above for the E-AGCH.

In addition to the signaling methods for step 320 described above, various other techniques may be utilized. For example, the existing broadcast control channel (BCCH)/broadcast channel (BCH) may be extended to include the signaling information related the activation/de-activation of individual HARQ processes. The existing RRC control signaling may be extended to convey information related to the activation/de-activation of individual HARQ processes. The high speed medium access control (MAC-hs) header may be modified to include activation/de-activation commands, with the format for the additional bits potentially being similar to one of the options described above for the E-AGCH. For this particular example, as retransmissions are asynchronous in the downlink (DL), and since the WTRU 110 can typically only decode the information once the downlink PDU decoding is successful, signaling options where an individual HARQ process is implicitly indicated by the signaling time should preferably refer to the transmission time of the HS-SCCH that corresponds to the first transmission for this downlink PDU.

To make the signaling compatible with the use of discontinuous reception (DRX) or discontinuous transmission (DTX) at the WTRU 110, it may be required to impose rules to force the WTRU 110 to listen, (i.e., not be in DRX), during TTIs where it would otherwise be in DRX, when certain conditions are met.

For example, the WTRU 110 could be required to not utilize DRX for a certain period of time immediately following resuming or interruption of voice activity, so that the NB 120 may modify the activated HARQ processes if needed. Alternatively, it could be required that the WTRU 110 listens periodically during certain TTIs when it would otherwise be in DRX, according to a pre-determined pattern. By way of another example, a WTRU 110 could be required to stop DRX, (i.e., listen in all TTIs), when the NB 120 deactivates a HARQ process until another HARQ process is activated. Thus, the NB 120 that desires to modify the HARQ process allocation of a particular WTRU 110 would start by de-activating one of the HARQ processes knowing that the WTRU 110 will be listening for the activation of the new HARQ process. The converse rule, (activate first and deactivate second), is also possible. More generally, a rule could be established that allows the WTRU 110 to activate DRX only when it has a specified number of HARQ processes activated.

To ensure that the new set of HARQ processes corresponds to the DRX/DTX pattern the WTRU 110 is using, the network may signal DRX activate and/or DTX activate from the NB 120 to the WTRU 110. Alternatively, signaling could be done by higher layers. Since individual or group WTRU signaling to enable or disable a process exists in the current state of the art, it can be extended to indicate conditions for usage of multiple processes.

The embodiments may also support macrodiversity. For example, a particular WTRU 110 may be in a state where it transmits to one or more NBs 120 (additional NBs not shown) in an active set in addition to its serving NB 120, which then sends the data to the RLC to be macro-combined. If the serving NB 120 changes the allocated HARQ processes, the other cells in the active set may blindly detect uplink transmissions from the WTRU 110 in the new HARQ processes, or the serving NB 120 may signal changes to the RNC 130 which then relates them to other NBs 120 in the active set.

Due to power control, all WTRUs 110 may be considered interchangeable with respect to their contribution to uplink interference. The NB 120, therefore, has the ability to choose which WTRU 110 it transfers between processes. Accordingly, the NB 120 can choose not to change the HARQ process allocation of WTRUs 110 in handover.

As WTRUs 110 move within the system, changes of E-DCH serving NB 120 will be required periodically. In order to support this mobility, several alternatives exist for the behavior of the WTRU 110 and NB 120 during this period. In one example, the WTRU 110 is allowed to transmit on any HARQ process that is not restricted by higher layers, (i.e., all processes are active), until it receives activation/de-activation commands from the new serving NB 120. Alternatively, the WTRU 110 may be disallowed to transmit on any HARQ process, (i.e., all processes are inactive), until it receives activation commands from the new serving NB 120.

In another preferred embodiment, however, the WTRU 110 maintains the same active/inactive state of each of its HARQ processes upon change of E-DCH serving NB 120. The new E-DCH serving NB 120 then sends an activation/de-activation command that changes the state of each HARQ process. If the new serving NB 120 sends a de-activation command for a HARQ process that was already inactive, or an activation command for a HARQ process that was already active, the WTRU 110 may ignore the command. Optionally, the new serving NB 120 may signal the active/inactive state of HARQ processes of the WTRU 110 by the RNC 130 upon setup of the radio link through Iub. Such signaling would require that the old serving NB 120 signals this information to the RNC 130, again through Iub, prior to or upon the change of E-DCH (enhanced data channel handler) serving Node-B.

The WTRU 110 then reacts to signaling that it receives (step 330). This reaction may include several variations. In one example, the WTRU 110 may listen at least when the MAC-e state changes from no uplink data to uplink data. A change from no data to data is indicated when N1 TTIs have elapsed where new data has arrived in the buffer. A change from data to no data is indicated when N2 TTIs have elapsed without new data arriving in buffer. N1 and N2 may be signaled beforehand by the network to the WTRU 110. If signaled specifically the WTRU 110 must then enable or disable the processes as instructed.

In an alternative example, if the WTRU 110 is signaled as a part of a group of WTRUs, the WTRU 110 may decide randomly whether to execute the instruction utilizing a probability that may be signaled by the network. In order to support synchronous retransmissions within a HARQ process, preferably the WTRU 110 should only be allowed to switch to a different HARQ process once the current HARQ process is complete, that is, once a positive ACK has been received or the maximum number of retransmissions has been met. Alternatively, if signaled as part of a group, the WTRU 110 may wait a random amount of time before executing the instruction, where the random amount of time may be signaled to the WTRU 110 beforehand by the network.

When DRX or DTX is activated, and if the WTRU 110 was previously instructed to behave so by higher layer signaling, the WTRU 110 adjusts the reference for its DRX and DTX pattern to correspond to the time of the last DRX or DTX activation signal, respectively. Alternatively the WTRU 110 adjusts the DRX/DTX pattern to correspond to the set of HARQ processes signaled. The mapping of HARQ processes to DRX/DTX patterns could be pre-determined, or could be signaled ahead of time by higher layer signaling.

In the current 3GPP Release 6 architecture, the RRC layer is terminated at the RNC 130. When leaving control of the HARQ process activation to the NB 120, the NB 120 may require information about the quality of service (QoS) requirements of the WTRU 110 to avoid an excessive reduction in the number of activated processes. Such a reduction of the number of activated processes in a non-scheduled operation would undesirably force the WTRU 110 to increase its instantaneous data rate during its active processes and reduce the area over which it can meet its QoS. Accordingly, it may be useful to have the RNC 130 communicate information to the NB 120 regarding the WTRUs 110, or have the NB 120 acquire the information in some other way.

For example, the RNC 130 may estimate the minimum number of HARQ processes that need to be activated at a given time to support the WTRU 110 transmissions. The RNC 130 has the capability of performing this estimation since it knows what the guaranteed bit rate is and has control over the throughput of the HARQ process through outer-loop power control and HARQ profile management. The RNC 130 communicates this number of HARQ processes to the NB 120 through NBAP signaling. The NB 120 ensures that the WTRU 110 has at least this number of HARQ processes activated at any time. Because of the simplicity, this process may be desirable for the NB 120.

Additionally, the RNC 130 may provide the guaranteed bit rate to the NB 120 through NBAP signaling. Based on the guaranteed bit rate, the NB 120 estimates how many active HARQ processes are required at a given time and activates individual processes accordingly. The NB 120 may also determine to deactivate certain processes during periods of inactivity.

Alternatively, the RNC 130 may not provide any information to the NB 120. Instead, the NB 120 may endeavor to maintain the number of active HARQ processes for a given WTRU 110 to the smallest possible value with the constraint that it never has to transmit more than one RLC PDU at a time unless all HARQ processes are already activated. The NB 120 could detect the transmission of more than one RLC PDU by inspecting the content of successfully decoded MAC-e PDUs. This approach provides significant flexibility to the NB 120, but may be more complex to implement.

Any HARQ process allocation changes and resulting DRX/DTX pattern or reference changes determined by NB 120 may be signaled to the RNC 130, which may signal those changes to a target NB 120 in case of handover.

In the current state of the art, the set of HARQ processes that the WTRU 110 is allowed to use is indicated by the RNC 130 through L3 signaling. This signaling could be maintained, indicating the allowed HARQ processes for the WTRU 110, which may be activated or deactivated by the NB 120 as per the various schemes described above. In addition, the RNC 130 could indicate to the WTRU 110 the initial set of HARQ processes to be activated.

Figure 3B:
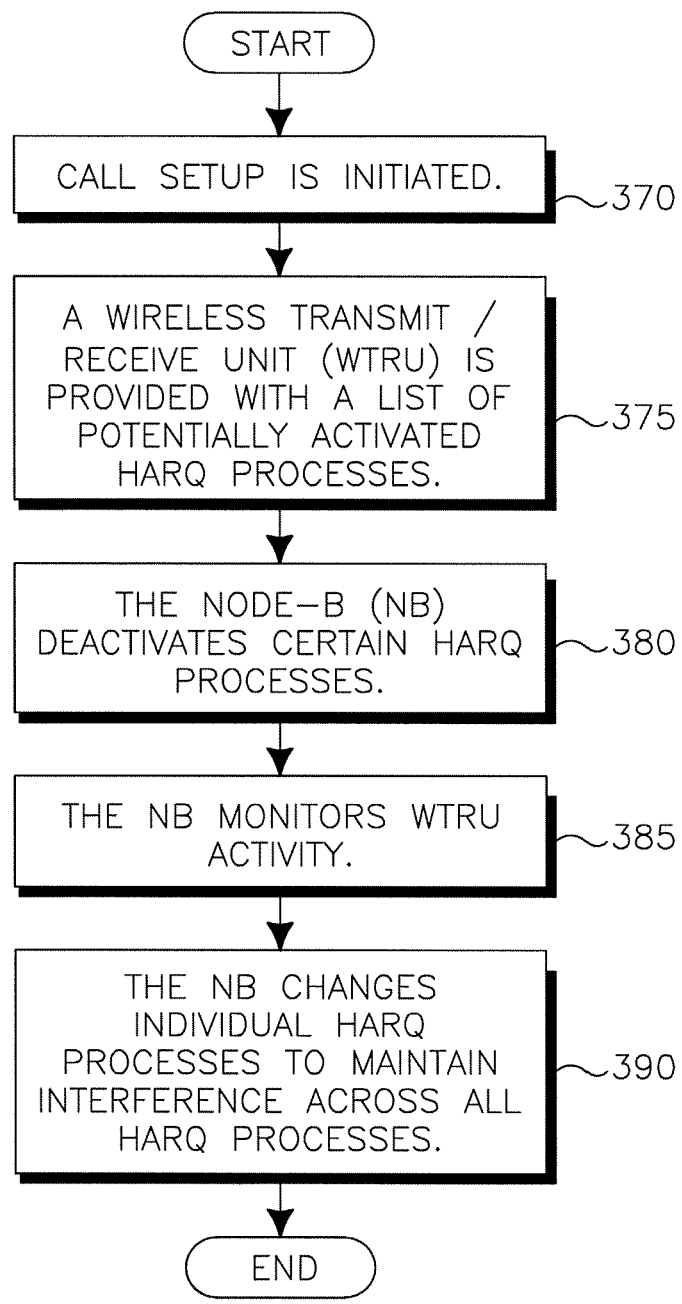
FIG. 3B is a flow diagram of an exemplary implementation of the method of FIG. 3A.

FIG. 3B is a flow diagram of an exemplary implementation 305 of the method 300 of FIG. 3A. In particular, the implementation 305 allows the RNC 130, NB 120 and WTRU 110 to optimize capacity, such as for VoIP or any other delay sensitive application. Upon call setup initiation (step 370), a particular WTRU 110 is preferably provided with a list of potentially activated HARQ processes (step 375). Alternatively, if a list is not provided, the WTRU 110 may assume that it can potentially use all HARQ processes. The RNC 130 also provides information to the NB 120, preferably through NBAP to aid the NB 120 in determining the required number of HARQ processes.

After the WTRU 110 commences transmission, the NB 120 begins de-activating HARQ processes for which the interference in the system is the greatest (step 380). Additionally, the NB 120 maintains as active the HARQ processes for which interference was minimal.

The NB 120 then continuously monitors the activity of all admitted WTRUs 110 in the system with non-scheduled transmissions (step 385) and tries to maintain the interference across all HARQ processes below a particular threshold by changing the active HARQ processes as a function of activity (step 390). There are numerous ways in which to perform step 390.

One way is that when the NB 120 detects that a previously inactive WTRU 110 becomes active, the NB 120 changes the set of active HARQ processes for this WTRU 110 to HARQ processes where the interference is the least. Alternatively, if a previously active WTRU 110 becomes inactive, it can swap its set of active HARQ processes with the set of another active WTRU 110. Additionally, the NB 120 could also deactivate most HARQ processes of a particular WTRU 110 that has become inactive, and activate other HARQ processes, such as where interference is minimal, when activity resumes.

Another alternative is that the NB 120 may monitor the interference on each HARQ process and periodically re-allocate one of the HARQ processes of one WTRU 110 from the most interfered HARQ process to the least interfered HARQ process, provided that the maximum level of interference over all processes does not increase. That is, a most interfered with HARQ process in the WTRU 110 is deactivated and a least interfered with HARQ process in the WTRU 110 is activated.

Figure 4:
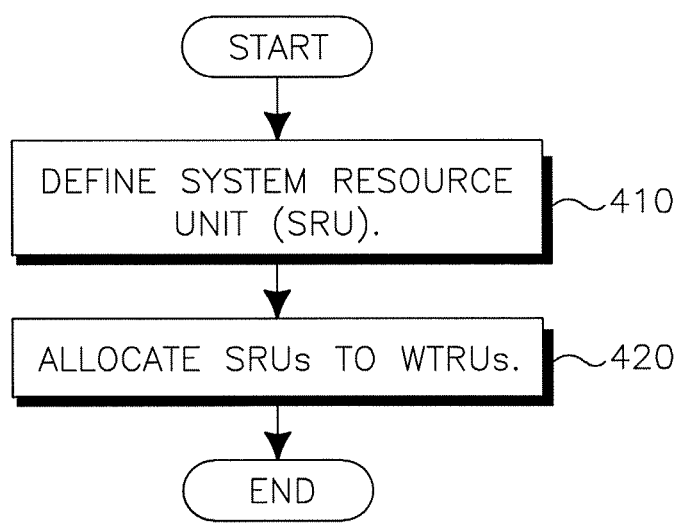
FIG. 4 is a flow diagram of a method of allocating processes, in accordance with an alternative embodiment.

FIG. 4 is a flow diagram of a method 400 of allocating processes, in accordance with an alternative embodiment. Since the purpose of the E-APICH is to maintain an uplink interference profile that is as uniform as possible between HARQ processes, a group-wise allocation of system resources is possible to the WTRUs 110.

In step 410 of the method 400 of FIG. 4, a system resource unit (SRU) is defined. Preferably, the SRU is defined to be a combination of a HARQ process and a granular amount of an interfering system resource, such as rate or power. The interfering system resource is preferably defined by considering that in an interference limited system, such as a CDMA uplink, there is only a finite amount of power or rate that can be utilized by transmitters simultaneously. Usage of more resources than is available will cause interference and likely loss of packets. Although in a preferred embodiment, the interfering system resource is typically measured using rate or power, other measures can be used. Additionally, required signal-to-interference ratio (SIR), received power, uplink load, (i.e., a fraction of UL pole capacity) are measures that may also be utilized.

In step 420 of the method 400 of FIG. 4, the SRUs are allocated to the WTRUs 110. In fact, all allocation in the present alternative embodiment of the invention is done using SRUs. Preferably, a group of WTRUs 110 is selected and allocated the same non-scheduled SRUs. Depending on how the SRU is defined this can be performed in a variety ways. For example, if SRU=(HARQ process, power), then HARQ processes can be allocated via RRC signaling, where power is allocated via a mechanism such as the E-AGCH. All SRU processes within a group are assumed active, and therefore, all HARQ processes are active. Fast allocation is used only to allocate SRUs within the group. Optional "banning" of SRUs in a group is possible to make sure that no WTRU 110 in a group uses a particular HARQ process at a given time.

The allocation of SRUs to WTRU groups may be performed by allocating SRUs to single groups such that if this is the only group transmitting, system resources are now exceeded and successful communication is assured. However, when multiple groups are present, the total number of SRUs allocated in a cell may exceed the total number of available SRUs.

Figure 5:
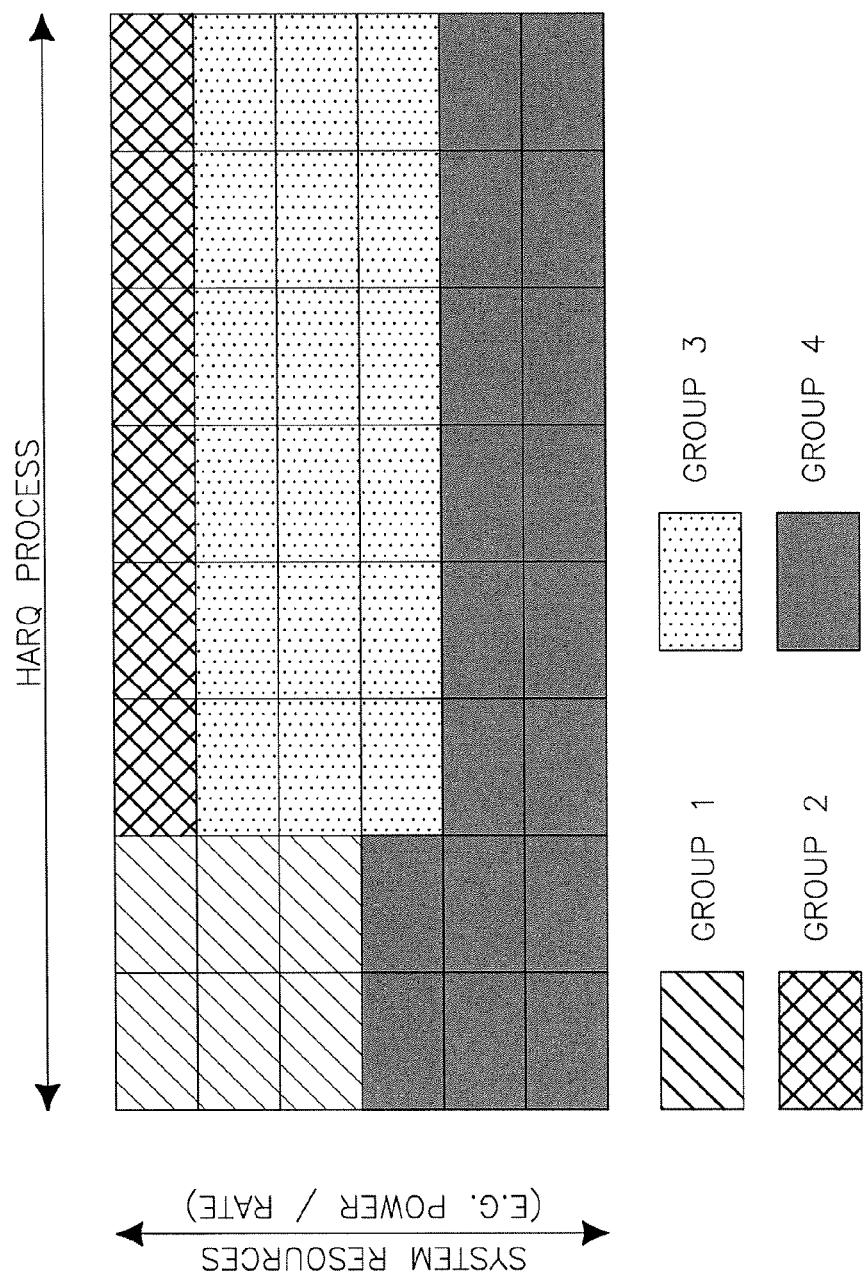
FIG. 5 is an exemplary diagram of system resource unit (SRU) allocation in accordance with the method of FIG. 4.

FIG. 5 is an exemplary diagram of system resource unit (SRU) allocation in accordance with the method 400 of FIG. 4. In the example shown in FIG. 5, it may be assumed that a system supports 8 HARQ processes and only 3 SRUs can be supported simultaneously. No WTRU group is allocated SRUs such that it can induce self-interference. However, a total of twice as many SRUs as are available have been allocated, making it possible that interference will occur if the WTRUs 110 all transmit at the same time. As shown in FIG. 5, the SRUs are allocated to groups of WTRUs 110 designated as Group 1, Group 2, Group 3, and Group 4. However, it should be noted that the depiction of four groups is exemplary, and any number of groups could be envisioned. By allocating one or several SRUs to groups of WTRUs 110, fast allocation of SRUs is then signaled by the NB 120, preferably using the E-APICH, where the NB 120 ensures that no two WTRUs 110 in a particular group are allocated the same SRU.

There are several advantages and challenges to a groupwise approach as described in method 400. By grouping the WTRUs 110, scheduling in the NB 120 may be simplified. For example, HARQ allocations are semi-static between groups and dynamic only within a group. On the other hand, a group provides both sufficient freedom and sufficient response time to keep the interference profile relatively stable.

Additionally, signaling overhead may be reduced since only a single E-APICH per group is required. All WTRUs 110 in a group monitor the same E-APICH. Moreover, there is no need for individual "power grant" to a WTRU 110. A particular WTRU 110 can always be granted more or less power in a given HARQ process by providing it more SRUs or by removing some.

However, as WTRUs 110 enter and leave the cell, a group may need to be updated, which may lead to an increase in signaling overhead. This problem may be mitigated by not updating a full group every time a WTRU 110 enters or leaves a group. Because a particular WTRU 110 only needs to know its own group and its ID within a group the group update overhead can be reduced.

For example, if a WTRU 110 leaves a cell, it group is maintained intact, but the NB 120 does not allocate any SRUs to that WTRU 110. Similarly, if a WTRU 110 enters a cell, it may be added to a group which has an opening, for example due to a WTRU in a group previously leaving a cell, or a new group may be created, with this WTRU 110 as the only member. Other WTRUs 110 may subsequently be added to the newly created group. In any case, the NB 120 may occasionally have to reconfigure the groups. However, this will likely be a very infrequent event.

Depending on the scheduler of the NB 120, the rate required or services supported by the group size of the WTRUs 110 may vary. Therefore, there are a variety of ways in which to form the groups.

For example, the total SRUs per group may be fixed. The number of WTRUs 110 per group may be fixed. The total of a particular individual resource, (e.g., rate, power, HARQ processes) per group may be fixed. A group may be comprised of WTRUs 110 with similar receiver characteristics, (e.g. Multi-in-Multi-out (MIMO) enabled, Type-x receiver). A group may also be comprised of WTRUs 110 with similar channel qualities.

Although multiplexing and signaling options for groupwise E-APICH are similar to those described above for the per-WTRU fast allocation, the signaling options may need to be modified. Since all HARQ processes are assumed active for a group, the E-AGCH in a given TTI includes the group index of the WTRU 110 to which this process is allocated. A special index or non-existing WTRU index may be used to ban the HARQ process for all WTRUs 110 in a group.

Additionally, implicit signaling via timing of transmission may not be practical for a group, although it may be used as an overlay for banning the HARQ process. Also, instead of a bit field, a symbol, (i.e., multi-bit), field is used, where each symbol indicates which WTRU 110 is permitted a particular HARQ process and a special symbol or non-existing WTRU index may be used to ban the process. For example, each WTRU 110 may be assigned a position of a bit field. A "0" may indicate that the WTRU assigned to this position cannot use the process while a "1" may indicate that the WTRU can use the particular process. Additionally, one of the positions of the bit field might be assigned to no specific WTRU 110, and rather be used to indicate that the process either can or cannot be used by any, or all, of the WTRUs 110.

Figure 6:
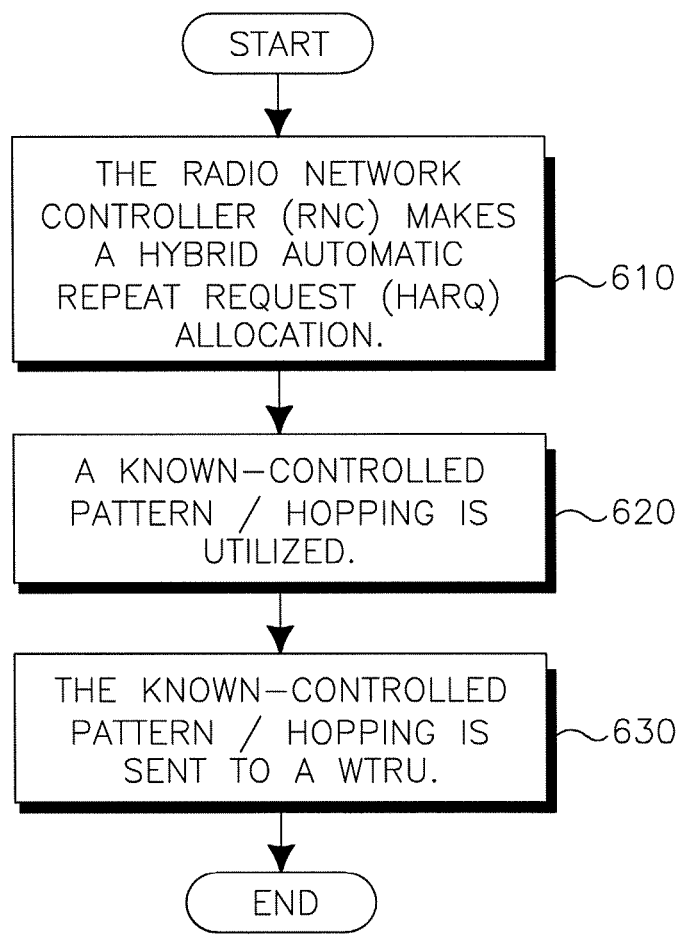
FIG. 6 is a flow diagram of a method of allocating processes, in accordance with an alternative embodiment.

FIG. 6 is a flow diagram of a method 600 of allocating processes, in accordance with an alternative embodiment. In the present alternative embodiment, non-scheduled operation may be enhanced by sending minimal downlink signaling that includes enough information to a WTRU 110 for dynamically changing HARQ processes within the constraints specified in the downlink signaling. The current RRC signaling of HARQ allocation for non-scheduled operation may be made such that the HARQ processes are restricted and staggered for the WTRUs 110 so that there is a smooth WTRU load distribution across the HARQ processes. However, this does not smooth out the voice activity variations which can cause high interference during some HARQ processes.

The RRC signaling of restricted and staggered HARQ allocation may be utilized to enhance non-scheduled operation. In step 610 of method 600, the RNC 130 makes a HARQ allocation. Once that HARQ allocation is made, a known-controlled pattern/hopping allocation may be utilized (step 620). This known-controlled pattern/hopping may be used to move the WTRUs 110 that are on top of the RNC 130 allocation in such a way that the load of WTRUs per HARQ process remains as before, but the voice activity is smoothed out across HARQ processes. Preferably, the known-controlled pattern/hopping distributes and smooths the variations of voice activity while not disturbing the WTRU load distribution benefits achieved by restriction and staggering of HARQ processes. Additionally, it may be bounded below by a non-scheduled HARQ process allocation that is restricted and staggered.

The known-controlled pattern/hopping is sent to a particular WTRU 110 (step 630) in a variety of ways. For example, it may be sent by RRC signaling or other downlink signaling, such as by the new physical channel E-APICH signaling described above. The pattern may be signaled at call setup time or during a call/session on a semi-static basis which may be needed to fine tune previous allocations due to changes in the system such as in load-variations.

Additionally, the known-controlled pattern/hopping may take the form of any pattern that generally preserves the load balance of the WTRUs 110 across the HARQ processes, as provided by the RRC allocation of non-scheduled operation. For example, it may take the form of sequential hopping of HARQ processes, from the initial RNC allocation, based on a multiple of TTI period that may be specified in RRC or other downlink signaling. The sequential hopping is circular over the maximum number of HARQ processes and the hopping direction is picked randomly, for example, with a 0.5 probability.

Alternatively, the RRC may initially allocate a set of HARQ processes to the WTRU 110 and the WTRU 110 may "hop" among them periodically with some multiple of TTIs specified in the RRC or other downlink signaling. In another alternative, the WTRU 110 hopping may be randomized based on a pseudo-random pattern and the hopping period specified by RRC or other downlink signaling.

In yet another alternative, the WTRU 110 may randomly select a signaled number of processes to be used in each cycle of 8 processes, for example, or the WTRU 110 may randomly decide, each TTI, whether to transmit or not according to a probability that may be signaled to the WTRU 110 beforehand. In another alternative, the probability could depend on the WTRU uplink buffer occupancy that is defined by the network and signaled beforehand.

Figure 7:
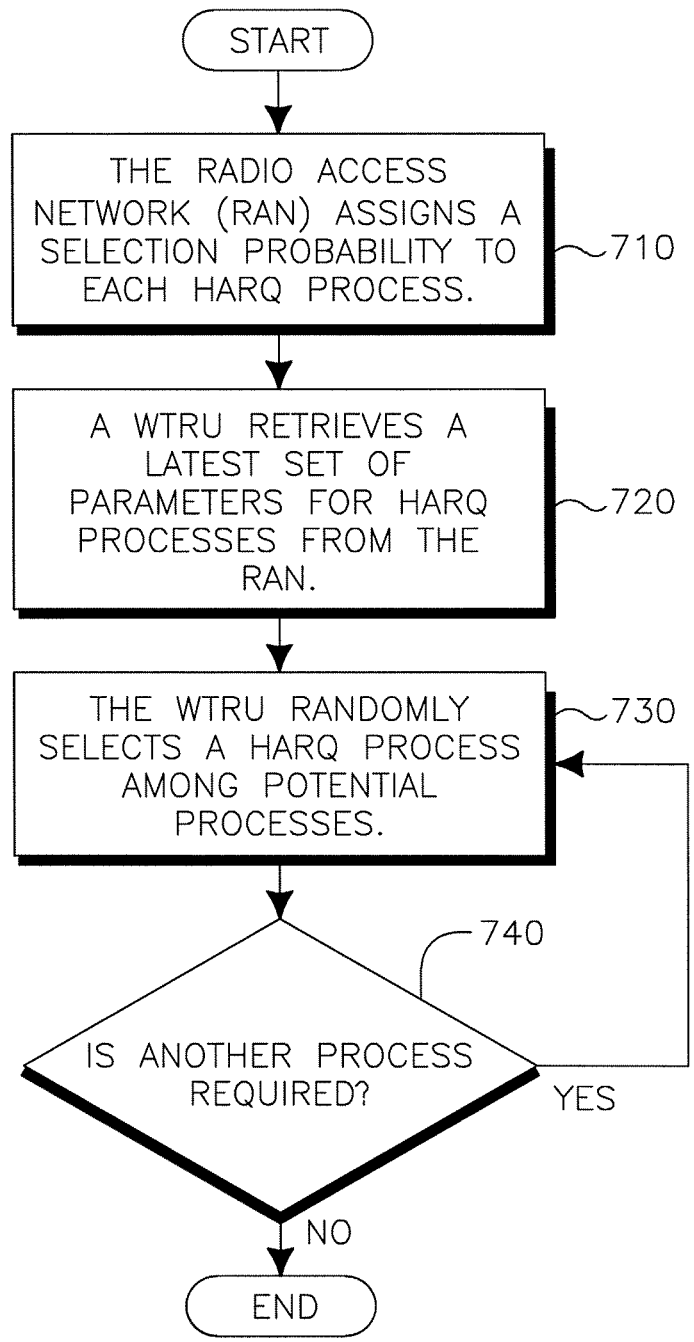
FIG. 7 is a flow diagram of a method of allocating processes, in accordance with an alternative embodiment.

FIG. 7 is a flow diagram of a method 700 of allocating processes, in accordance with an alternative embodiment. In the method 700 described in FIG. 7, HARQ processes uses for uplink (UL) transmissions are randomly selected by particular WTRUs 110 during selection opportunities. Thes selection opportunities occur every M TTIs, where M is preferably a multiple of the total number of HARQ processes, (e.g., 8, 16). The WTRU should be pre-configured through higher layers to select P HARQ processes on which it is allowed to transmit until the next selection opportunity.

In step 710, the RAN assigns a selection opportunity to each HARQ process. Preferably, the RAN provides a selection probability between 0 and 1 for each of the allowed HARQ processes, where the sum of the probabilities for all HARQ processes equals 1. This allows the RAN to favor some processes over others, based on such factors as interference generated from scheduled WTRUs 110 and intercell interference. The random distribution that is used to select the HARQ processes is signaled by the RAN to the WTRU 110 or WTRUs 110. The signaling of these parameters may be achieved using any of the signaling mechanisms described above. The parameters can be signaled individually to each WTRU 110, to a group of WTRUs 110 or for all WTRUs 110 at once. Preferably, updates to the parameters may be made at the frequency at which WTRUs 110 select HARQ processes or at a slower frequency.

At every selection opportunity, the WTRU 110 should retrieve the latest set of parameters signaled from the RAN (step 720). The WTRU 110 then selects a first HARQ process by randomly selecting a HARQ process among potential processes (step 730), taking into consideration the selection probability of each process.

If another process is required (step 740), then the WTRU 110 randomly selects among the remaining processes (step 730), taking into consideration the selection probability of the remaining processes. The process continues until the number of processes on which the WTRU is allowed to transmit until the next selection opportunity (P) have been selected.

In order to support synchronous retransmissions within a HARQ process, preferably the WTRU 110 should only be allowed to select a different HARQ process once the current HARQ process is complete, for example once a positive ACK has been received or the maximum number of retransmissions has been met.

Although the features and elements are described in the preferred embodiments in particular combinations, each feature or element can be used alone without the other features and elements of the preferred embodiments or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
a processor and a transmitter configured to transmit uplink data utilizing N hybrid automatic repeat request (HARQ) processes, wherein N is an integer, wherein one of the N HARQ processes is used to transmit the uplink data in each of a plurality of transmission time intervals, and the N HARQ processes are used to transmit the uplink data sequentially, wherein the uplink data comprises scheduled data; and
a receiver, wherein the processor and the receiver are configured to receive a message from a wireless network, wherein the processor and the transmitter are further configured, in response to the message, to transmit uplink data utilizing less than N HARQ processes.

2. The WTRU of claim 1 wherein the processor and transmitter are further configured to transmit the uplink data utilizing the less than N HARQ processes sequentially.

3. The WTRU of claim 2 wherein a switch between the HARQ processes of the less than N HARQ processes occurs at an integer number of transmission time intervals.

4. The WTRU of claim 1 wherein a transmission time interval is 2 ms.

5. The WTRU of claim 1 wherein N is 8.

6. The WTRU of claim 1 wherein the processor and the receiver are configured to receive an allocation of resources corresponding to a plurality of transmission time intervals; wherein the processor and the transmitter are configured to transmit using a fixed allocation of resources using a corresponding one of the N HARQ processes in a corresponding transmission time interval on a condition that the allocation of resources is not received, and to transmit using the received allocation of resources using a corresponding one of the N HARQ processes in a corresponding transmission time interval on a condition that the allocation of resources is received.

7. A method for use in a wireless transmit/receive unit (WTRU), the method comprising:

using a processor and a transmitter to transmit uplink data utilizing N hybrid automatic repeat request (HARQ) processes, wherein N is an integer, wherein one of the N HARQ processes is used to transmit the uplink data in each of a plurality of transmission time intervals, and the N HARQ processes are used to transmit the uplink data sequentially, wherein the uplink data comprises scheduled data;

using the processor and a receiver to receive a message from a wireless network; and in response to the message, using the processor and the transmitter to transmit uplink data utilizing less than N HARQ processes.

8. The method of claim 7 wherein transmitting the uplink data utilizing the less than N HARQ processes is performed sequentially.

9. The method of claim 8 further comprising:
switching between the HARQ processes of the less than N HARQ processes at an integer number of transmission time intervals.

10. The method of claim 7 wherein a transmission time interval is 2 ms.

11. The method of claim 7 wherein N is 8.

12. The method of claim 7 further comprising:
receiving an allocation of resources corresponding to a plurality of transmission time intervals;
transmitting, using a fixed allocation of resources using a corresponding one of the N HARQ processes in a corresponding transmission time interval, on a condition that the allocation of resources is not received; and
transmitting, using the received allocation of resources using a corresponding one of the N HARQ processes in a corresponding transmission time interval, on a condition that the allocation of resources is received.

13. A Node-B comprising:
a processor and a receiver configured to receive uplink data utilizing N hybrid automatic repeat request (HARQ) processes, wherein N is an integer, wherein one of the N HARQ processes is used to receive the uplink data in each of a plurality of transmission time intervals, and the N HARQ processes are used to receive the uplink data sequentially, wherein the uplink data comprises scheduled data; and a transmitter, wherein the processor and the transmitter are configured to transmit a message, wherein the processor and the receiver are further configured, in response to the message, to receive uplink data utilizing less than N HARQ processes.

14. The Node-B of claim 13 wherein the processor and receiver are further configured to receive the uplink data utilizing the less than N HARQ processes sequentially.

15. The Node-B of claim 14 wherein a switch between the HARQ processes of the less than N HARQ processes occurs at an integer number of transmission time intervals.

16. The Node-B of claim 13 wherein a transmission time interval is 2 ms.

17. The Node-B of claim 13 wherein N is 8.

18. The Node-B of claim 13 wherein the processor and the transmitter are configured to transmit an allocation of resources corresponding to a plurality of transmission time intervals.

19. A method for use in a Node-B, the method comprising:
using a processor and a receiver to receive uplink data utilizing N hybrid automatic repeat request (HARQ) processes, wherein N is an integer, wherein one of the N HARQ processes is used to receive the uplink data in each of a plurality of transmission time intervals, and the N HARQ processes are used to receive the uplink data sequentially, wherein the uplink data comprises scheduled data;

using the processor and a transmitter to transmit a message; and in response to the message, using the processor and the receiver to receive uplink data utilizing less than N HARQ processes.

20. The method of claim 19 wherein receiving the uplink data utilizing the less than N HARQ processes is performed sequentially.

21. The method of claim 19 further comprising:
transmitting an allocation of resources corresponding to a plurality of transmission time intervals.

* * * * *

UNITED STATES PATENT AND TRADEMARK OFFICE
CERTIFICATE OF CORRECTION

PATENT NO.        : 8,687,508 B2                                                    Page 1 of 1
APPLICATION NO.   : 11/841156
DATED             : April 1, 2014
INVENTOR(S)       : Marinier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1710 days.

Signed and Sealed this
Thirtieth Day of May, 2017

Michelle K. Lee
*Director of the United States Patent and Trademark Office*